United States Patent [19]

Sandrock

[11] 4,079,523

[45] Mar. 21, 1978

[54] IRON-TITANIUM-MISCHMETAL ALLOYS FOR HYDROGEN STORAGE

[75] Inventor: Gary Dale Sandrock, Ringwood, N.J.

[73] Assignee: The International Nickel Company, Inc., New York, N.Y.

[21] Appl. No.: 739,486

[22] Filed: Nov. 8, 1976

[51] Int. Cl.² .................. F26B 1/28; F26B 1/32
[52] U.S. Cl. .................. 34/15; 75/123 E; 75/123 M; 75/134 F; 75/175.5; 423/644
[58] Field of Search .......... 75/58, 123 E, 123 M, 75/129, 134 F, 175.5, 123 K; 34/15; 136/86 D, 86 DD, 120 R; 252/471, 425.3; 423/248, 644; 55/158

[56] References Cited

U.S. PATENT DOCUMENTS

| | | | |
|---|---|---|---|
| 2,683,661 | 7/1954 | Tisdale | 75/58 X |
| 3,508,414 | 4/1970 | Wiswall, Jr. et al. | 34/15 |
| 3,516,263 | 6/1970 | Wiswall, Jr. et al. | 34/15 |
| 3,529,958 | 9/1970 | Buehler | 75/135 |
| 3,679,403 | 7/1972 | Bomberger | 75/175.5 |
| 3,922,872 | 12/1975 | Reilly et al. | 75/175.5 |
| 3,940,912 | 3/1976 | Buchner | 55/158 |
| 3,957,534 | 5/1976 | Linkohr et al. | 75/175.5 X |
| 4,011,075 | 3/1977 | Watanabe et al. | 75/175.5 X |

Primary Examiner—L. Dewayne Rutledge
Assistant Examiner—Michael L. Lewis
Attorney, Agent, or Firm—Walter A. Petersen; Ewan C. MacQueen; Raymond J. Kenny

[57] ABSTRACT

A method for the preparation of an iron-titanium-mischmetal alloy which is used for the storage of hydrogen. The alloy is prepared by air-melting an iron charge in a clay-graphite crucible, adding titanium and deoxidizing with mischmetal. The resultant alloy contains less than about 0.1% oxygen and exhibits a capability for hydrogen sorption in less than half the time required by vacuum-melted, iron-titanium alloys.

9 Claims, No Drawings

IRON-TITANIUM-MISCHMETAL ALLOYS FOR HYDROGEN STORAGE

The invention described herein was made in the course of, or under a contract with the U.S. Energy Research and Development Administration.

The present invention is directed to a method for the preparation of an iron-titanium-mischmetal alloy intended for storage of hydrogen.

Recently, considerable attention has been directed to the development of metallic compounds suitable for the storage of hydrogen as a metal hydride. Such alloys provide the capability for absorbing hydrogen at a density almost twice that found in liquid hydrogen or about $6 \times 10^{22}$ atoms/cm$^3$.

Alloys based on the intermetallic compound FeTi have been successfully used for the storage of hydrogen. The suitability of iron-titanium and iron-titanium-manganese alloys for the storage of hydrogen has been described in U.S. Pat. Nos. 3,508,414; 3,516,263; and 3,825,418. It is essential in these alloys, as well as in the alloys of the present invention, that the oxygen content be controlled below about 0.3%, and preferably below about 0.1%, by weight, since oxygen as a $Fe_7Ti_{10}O_3$ compound severely restricts the capability for sorption of hydrogen and promotes particle size breakdown of hydriding alloy granules during service.

Due to the great affinity of titanium for oxygen, iron-titanium compounds have been prepared by the use of electric-arc melting in vacuuum or vacuum/inert gas using a water-cooled copper crucible. The use of a vacuum substantially limits contact with atmospheric oxygen, and the use of a water-cooled copper crucible substantially avoids contamination by the reduction of oxides found in refractory melting chambers. Although the procedures involved with vacuum arc melting provide low-oxygen, hydridable iron-titanium alloys, this procedure is, in many instances, prohibitively expensive, and the requisite vacuum-melting equipment is not readily available in many melt shops.

It has now been discovered that iron-titanium-mischmetal alloys have improved hydrogen activation characteristics and can be prepared by air melting.

Generally speaking, the present invention is directed to a method for air-melting low-oxygen, iron-titanium-mischmetal alloys suitable for use in hydrogen storage apparatus comprising the steps of; melting a charge of iron in a graphite-containing crucible, adding a charge of titanium to the molten iron to form a molten alloy within the crucible while heating the molten alloy to a temperature of about 1425° C, deoxidizing the molten alloy within the crucible with a mischmetal addition to form a deoxidized molten alloy and an oxide-containing slag, and pouring the deoxidized molten alloy from the crucible.

The alloy prepared by the method of the present invention contains, by weight, from about 42% to about 52% titanium, from about 0.05% to about 1.5% mischmetal (as obtained by analyses for Ce+La content), up to about 0.1% oxygen, up to about 10% manganese, up to about 10% nickel, and the balance essentially iron. It is preferred that the alloy contain from about 45% to about 50%, by weight, titanium, from about 0.1% to about 1.2% mischmetal, up to about 0.08% oxygen, and the balance essentially iron.

As will be understood by those skilled in the art, the use of the expression "balance essentially" does not exclude the presence of other elements commonly present as incidental elements, e.g., the deoxidizing and cleaning aid elements, and impurities normally associated therewith in small amounts which do not adversely affect the novel characteristics of the alloys.

The mischmetal used for the preparation of the iron-titanium-mischmetal alloy of this invention is a mixture of rare-earth elements in metallic form where the rare-earth elements are those having atomic numbers between 57 and 71. Commercially produced mischmetal obtained from the Molybdenum Corp. of America generally contains about 48 to 50% cerium, 32 to 34% lanthanum, 13 to 14% neodymium, 4 to 5% praseodymium, and about 1.5% other rare-earth metals.

Without being bound to any particular theory, it is believed that the cerium and lanthanum contained within the mischmetal are largely responsible for the removal of oxygen from the iron-titanium melt; however, the presence of cerium and lanthanum are not entirely responsible for the improved hydrogen activation characterized by the alloy of this invention. Rather it is the presence of the combination of rare-earth elements contained within the mischmetal addition that results in the improvement in the ease with which iron-titanium-mischmetal alloys can be activated as compared to known vacuum-melted iron-titanium alloys, (i.e., the addition of cerium or lanthanum alone is not as effective as an addition of an equal amount of considerably less expensive mischmetal).

The successful preparation of a low-oxygen alloy during air melting is, to a large extent, dependent upon the use of a graphite-containing crucible or lining in the melting furnace. To illustrate, attempts to air melt (under an argon blanket) an iron-titanium alloy in a magnesia-lined furnace without mischmetal deoxidation results in an oxygen content of between about 0.5 and 0.7%, by weight. By air melting under essentially the same conditions in a clay-graphite crucible, such as the type of crucible sold under the Trademark DIXA-GRAF and available from the Joseph Dixon Crucible Company, an oxygen content of between about 0.3 to about 0.35%, by weight, can be achieved in the iron-titanium alloys. However, this level of oxygen is excessive for efficient storage of hydrogen in an iron-titanium alloy.

The iron-titanium-mischmetal alloy is prepared by melting a charge of iron in a graphite-containing crucible or in a furnace having a graphite-containing lining. The molten iron is heated to a temperature of about 1600° C. Melting may be carried out in an induction furnace, electricarc furnace, gas-fired furnace, or any other suitable type of melting furnace. The surface of the molten iron can be exposed to air or preferably, but not absolutely essential, shielded from excessive oxidation from this source by a blanket of argon or by the use of a suitable protective flux layer on the surface of the melt. Once the pool of molten iron is established, titanium is added directly to the pool. Titanium can be added in the form of scrap, preferably wrought titanium, consolidated titanium sponge briquettes, ferrotitanium, etc. Since titanium has a higher melting temperature (1668° C) than iron (1536° C), the rate at which the titanium is added to the iron should be sufficiently slow so that the melt does not bridge within the melting chamber. Once the iron and titanium have thoroughly mixed, the temperature of the melt should be adjusted to about 1425° C (melting temperature of the iron-titanium compound is about 1325° C) and the mischmetal added.

Due to the well known high reactivity of mischmetal, at least about 1%, and preferably about 4%, by weight, should be added to the melt. The amount added to the melt should be sufficient so that at least about 0.05%, and preferably at least about 0.1% mischmetal, by weight, is retained in the alloy. In addition to the advantageous hydriding property provided by mischmetal, the grain size of solidified melts containing mischmetal is significantly smaller than that of vacuum-melted iron-titanium alloys.

The oxides that form as a result of reaction between the mischmetal and oxygen are separated from the melt. It is essential that sufficient time be allowed prior to pouring to allow the deoxidation of the melt to progress to a state where the oxygen content is at a sufficiently low level. To illustrate, in a small 8-kilogram melt to which 4%, by weight, of mischmetal was added, a holding period of at least one minute, and preferably two minutes, was required to lower the oxygen content of the melt from the vicinity of 0.3%, by weight, to a level somewhat below 0.05%, by weight. In a 100-kilogram heat of the iron-titanium-mischmetal alloy, a minimum holding period of about three minutes and a maximum of about 6 minutes are desirable. Correspondingly longer holding periods are required for larger size heats. However, the heat should be poured within a reasonable time period after the mischmetal addition since the heat will pick up oxygen from the atmosphere and to some extent from the clay-graphite crucible or furnace lining.

Following the melting operation and holding period to provide the required deoxidation, the melt is poured from the melting furnace into suitable pig molds and allowed to cool to room temperature. Graphite molds have been found to be useful for this purpose. Pigs of the iron-titanium-mischmetal alloy are readily crushed to granular form by conventional means.

The granules are sieved to remove excessively coarse and fine fractions and introduced to suitable metal containers. The containers are sealed and air substantially removed so that the iron-titanium-mischmetal alloy may be activated by allowing pressurized hydrogen to enter the container in a manner as hereinafter described. The activation cycle is generally repeated several times to fully activate the sample. Due to the presence of mischmetal, the iron-titanium-mischmetal alloy can be activated in less than half the time period required for vacuum-melted iron-titanium alloys of similar composition.

For the purpose of giving those skilled in the art a better understanding of the invention and/or a better appreciation of the advantages of the invention, the following illustrative examples are given:

EXAMPLE I

A charge of 4100 grams of Armco iron was melted under an argon blanket in a clay-graphite crucible. The melt temperature was adjusted to about 1540° C, and a total of 3575 grams of titanium was added to the melt as bundled titanium scrap.

The temperature of the melt was adjusted to 1425° C and the argon flow stopped. A 4%, by weight, addition of mischmetal (320 grams) was plunged beneath the surface of the melt. The temperature of the bath was maintained at 1425° C for about 2 minutes to allow the mischmetal addition to react with the oxygen contained in the melt.

The molten alloy was poured into a 2 diameter, tapered graphite mold. Upon cooling to room temperature, the ingot was removed from the graphite mold and crushed to provide granules suitable for hydriding tests.

The granules were sieved to provide a −30, +50 U.S. Standard Sieve Series fraction. A 6.5 gram sample of the alloy was placed within a 15 millimeter diameter by 10 millimeter high reactor vessel which was sealable by means of a valve. This sample size provided a free gas space above the sample within the reactor vessel. The reactor vessel was evacuated to a pressure of about $2\times10^{-5}$ Torr and heated to a temperature of 450° C. The specimen was held at this temperature and exposed to ultra high purity hydrogen at a pressure of 6.5 atmospheres for 15 minutes. The sample contained within the reactor vessel was cooled to room temperature and subjected to hydrogen at a pressure of 68 atmospheres. The sample was held for 6 days at 68 atmospheres pressure with occasional dehydriding and rehydriding cycles. Once the sample was considered to be fully activated, the hydrogen desorption characteristics of the alloy were examined. The hydrogen contained within the specimen was removed to a chamber having a calibrated volume in several steps. The equilibrium pressure was measured as a function of hydrogen, i.e., in terms of the ratio of H/M, (where H/M represents the atomic ratio of the number of hydrogen atoms to the number of metal atoms).

Table II shows the activation characteristics of the air-melted iron-titanium-mischmetal alloy and a vacuum-melted iron-titanium alloy. The mischmetal-containing alloy exhibited the advantageous capability for the sorption of hydrogen within less than half the time period required with the vacuum-melted, iron-titanium alloy.

The composition of an iron-titanium-mischmetal alloy prepared by air melting and the composition of a vacuum-melted heat of the iron-titanium composition are shown in Table I. Both the air melted and the vacuum melted heats showed a 40° C disassociation pressure plateau of about 7 atmospheres of hydrogen for H/M values ranging from 0.1 to about 0.6. Both heats had H/M values of about 0.9 when fully saturated with hydrogen to 68 atmospheres pressure.

TABLE I
Composition of Air-Melted Iron-Titanium-Mischmetal Alloy 1 and Vacuum-Melted Iron-Titanium Alloy A

| Alloy Identity | Fe | Ti | O | N | C | Ce | La |
|---|---|---|---|---|---|---|---|
| 1 | 52.6 | 46.2(1) | 0.034 | 0.062 | 0.020 | 0.91 | 0.16 |
| A | 54.4 | 45.5(1) | 0.038 | 0.040 | 0.070 | — | — |

(1)Estimated by difference.

TABLE II
Comparison of Activation of Air-Melted Iron-Titanium-Mischmetal to that of Vacuum-Melted Iron-Titanium Alloys

| Atomic Ratio of Hydrogen Atoms to Metal Atoms H/M | Time of Pressurization in Hours Alloy 1 (Fe Ti M) | Alloy A (Fe Ti) |
|---|---|---|
| 0.1 | 4 | 16 |
| 0.2 | 12 | 26 |
| 0.4 | 24 | 52 |
| 0.6 | 38 | 111 |
| 0.8 | 55 | 280 |

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

I claim:

1. A method for air-melting an alloy containing, in weight percent, from about 42% to about 52% titanium, from about 0.05% to about 1.5% mischmetal, up to about 0.1% oxygen, up to about 10% nickel, up to about 10% manganese, and the balance essentially iron, said alloy characterized by suitability for use in hydrogen storage apparatus, comprising:
   a. melting a charge of iron in a clay-graphite crucible;
   b. adding a charge of titanium to the molten iron to form a molten alloy within said crucible while heating said molten alloy to a temperature of about 1425° C;
   c. deoxidizing said molten alloy within said crucible with a mischmetal addition to form a deoxidized molten alloy; an oxide-containing slag; and result in on amount of mischmetal in said molten alloy of about 0.05% to about 1.5% mischmetal and
   d. pouring said deoxidized molten alloy from said crucible.

2. A method as defined in claim 1, wherein said clay-graphite crucible is contained within an induction furnace.

3. A method as defined in claim 1, wherein melting is performed under an argon blanket.

4. A method as defined in claim 1, wherein said charge of titanium comprises at least one of titanium pieces, consolidated titanium sponge, and ferrotitanium alloy.

5. A method as defined in claim 1, wherein said mischmetal addition is added in an amount of from about 2% to about 8%, by weight.

6. A method as defined in claim 5, wherein said mischmetal addition is in an amount of about 4%, by weight.

7. An alloy characterized by an advantageous capability for the sorption of hydrogen within less than half the time period required with vacuum melted iron-titanium hydrogen storage alloys containing, in weight percent, from about 42% to about 52% titanium, from about 0.05% to about 1.5% mischmetal, said mischmetal containing elements having atomic numbers between 57 and 71, up to about 0.1% oxygen, up to about 10% manganese, up to about 10% nickel, and the balance essentially iron, said alloy particularly suited for air melting.

8. An alloy as defined in claim 7 containing from about 45% to about 50% titanium and from about 0.1% to about 1.2% mischmetal.

9. The method of storing hydrogen characterized by an advantageous capability for the sorption of hydrogen within less than half the time period required with vacuum melted iron-titanium hydrogen storage alloys comprising contacting hydrogen gas with a granulated alloy containing, in weight percent, from about 42% to about 52% titanium from about 0.05% to about 1.5% mischmetal, said mischmetal containing elements having atomic numbers between 57 and 71, up to about 0.1% oxygen, up to about 10% manganese, up to about 10% nickel, and the balance essentially iron.

* * * * *